(12) United States Patent
Hei

(10) Patent No.: US 10,979,356 B2
(45) Date of Patent: Apr. 13, 2021

(54) COMMUNICATION METHOD AND COMMUNICATION SYSTEM

(71) Applicant: TOYOTA JIDOSHA KABUSHIKI KAISHA, Toyota (JP)

(72) Inventor: Yuichiro Hei, Fujimino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/525,933

(22) Filed: Jul. 30, 2019

(65) Prior Publication Data

US 2020/0044973 A1 Feb. 6, 2020

(30) Foreign Application Priority Data

Aug. 3, 2018 (JP) .............................. JP2018-146862

(51) Int. Cl.
*H04L 12/801* (2013.01)
*H04L 12/741* (2013.01)
*H04L 12/863* (2013.01)
*H04L 12/26* (2006.01)

(52) U.S. Cl.
CPC ........ *H04L 47/193* (2013.01); *H04L 43/0882* (2013.01); *H04L 45/745* (2013.01); *H04L 47/6255* (2013.01)

(58) Field of Classification Search
CPC ... H04L 47/193; H04L 47/745; H04L 47/625; H04L 43/0882; H04L 43/10; H04L 43/103; H04L 45/745
See application file for complete search history.

(56) References Cited

U.S. PATENT DOCUMENTS

| 2006/0203828 A1* | 9/2006 | Kumazawa | H04L 45/00 370/400 |
| 2006/0221820 A1* | 10/2006 | Zeitak | H04L 47/263 370/229 |
| 2009/0154356 A1* | 6/2009 | Wiemann | H04L 47/40 370/236 |
| 2010/0274872 A1* | 10/2010 | Harrang | H04L 47/10 709/217 |
| 2011/0002224 A1 | 1/2011 | Tamura | |
| 2012/0287937 A1* | 11/2012 | Kaya | H04L 45/28 370/401 |

(Continued)

FOREIGN PATENT DOCUMENTS

JP 2011-015288 A 1/2011

*Primary Examiner* — Candal Elpenord
(74) *Attorney, Agent, or Firm* — Oliff PLC

(57) ABSTRACT

A communication method in which a first communication device that is a transmission source of data, a second communication device that is a destination of the data, and one or more relay devices that relay the data transmit and receive the data using Segment Routing, wherein the relay device is configured to, when relaying the data, detect whether congestion occurs in the relay device, and when congestion occurs, set a first flag indicating the occurrence of congestion in a segment ID corresponding the relay device out of a plurality of segment IDs contained in a routing header of the data, and the second communication device configured to, when there is a segment ID in which the first flag is set in a routing header of received data, determine that congestion occurs in the relay device corresponding to the segment ID.

5 Claims, 12 Drawing Sheets

(56) References Cited

U.S. PATENT DOCUMENTS

2014/0269266 A1* 9/2014 Filsfils .................. H04L 43/50
370/228
2015/0256456 A1* 9/2015 Previdi .................. H04L 69/22
370/392

* cited by examiner

CONGESTION NOTIFICATION
PROCESSING FLOW PERFORMED BY
COMMUNICATION DEVICE

PROCESSING FLOW PERFORMED BY
RELAY DEVICE (SECOND EMBODIMENT)

PACKET RECEPTION FLOW PERFORMED BY COMMUNICATION DEVICE (SECOND EMBODIMENT)

US 10,979,356 B2

COMMUNICATION METHOD AND COMMUNICATION SYSTEM

CROSS REFERENCE TO THE RELATED APPLICATION

This application claims the benefit of Japanese Patent Application No. 2018-146862, filed on Aug. 3, 2018, which is hereby incorporated by reference herein in its entirety.

BACKGROUND

Technical Field

The present disclosure relates to a communication system.

Description of the Related Art

In a network in which communication is performed by a plurality of devices relaying packets, there is a technique for detecting that congestion occurs on a route. For example, in TCP/IP, a congestion information notification function (ECN: Explicit Congestion Notification) is defined, which makes it possible to detect that a relay device whose buffer is full due to congestion exists on the network.

Japanese Patent Application Publication No. 2011-015288 discloses a method of notifying congestion using ECN under a connectionless protocol, such as UDP, in an IP network.

SUMMARY

In recent years, with the development of technology, dynamic routing has become possible according to the network conditions. However, in the conventional art, a communication device can detect that congestion occurs on a packet transfer path, but cannot specifically detect in which relay device on the route the congestion occurs.

That is, in the conventional art, there is a problem in that it is not easy to dynamically regenerate a route while avoiding a relay device in which congestion occurs.

The present disclosure has been made in consideration of the above problem, and aims to identify a point at which congestion occurs on the network.

The present disclosure in its one aspect provides a communication method in which a first communication device that is a transmission source of data, a second communication device that is a destination of the data, and one or more relay devices that relay the data transmit and receive the data using Segment Routing, wherein the relay device is configured to, when relaying the data, detect whether congestion occurs in the relay device, and when congestion occurs, set a first flag indicating the occurrence of congestion in a segment ID corresponding the relay device out of a plurality of segment IDs contained in a routing header of the data, and the second communication device configured to, when there is a segment ID in which the first flag is set in a routing header of received data, determine that congestion occurs in the relay device corresponding to the segment ID.

The present disclosure in its another aspect provides a communication system comprising a first communication device that is a transmission source of data, a second communication device that is a destination of the data, and one or more relay devices that relay the data transmit and receive the data using Segment Routing, wherein the relay device comprises a detector configured to detect whether or not congestion occurs in the relay device when the data is relayed; and a notifier configured to, when congestion occurs, set a first flag indicating the occurrence of congestion in a corresponding segment ID corresponding the relay device out of a plurality of segment IDs contained in a routing header of the data, and the second communication device comprises a determiner configured to, when there is a segment ID in which the first flag is set in a routing header of received data, determine that congestion occurs in the relay device corresponding to the segment ID.

According to the present disclosure, it is possible to identify a point at which congestion occurs on the network.

DESCRIPTION OF THE EMBODIMENTS

Figure 1:
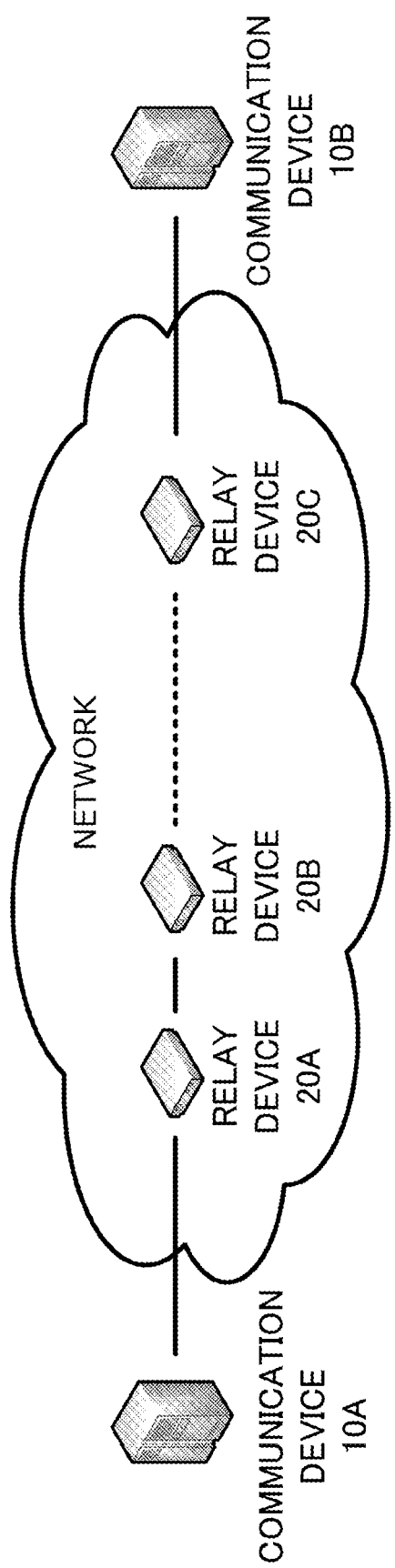
FIG. 1 is an overall configuration diagram of a communication system according to the present disclosure.

A communication method according to the present disclosure is a communication method in which a first communication device that is a transmission source of data, a second communication device that is a destination of the data, and one or more relay devices that relay the data transmit and receive the data using Segment Routing.

Segment Routing has a feature that a packet with a header containing a segment ID indicating a transfer path of the packet is transmitted, which allows a device that is a transmission source of the packet to flexibly specify a transmission path of the packet.

Specifically, the relay device is configured to, when relaying the data, detect whether congestion occurs in the relay device, and when congestion occurs, set the relay device sets a first flag indicating the occurrence of congestion in its corresponding segment ID out of a plurality of segment IDs contained in a routing header. The second communication device configured to, when there is a segment ID in which the first flag is set in a routing header of received data, determine that congestion occurs in the corresponding relay device.

The routing header contains a plurality of segment IDs corresponding to a plurality of relay devices. Therefore, when detecting congestion, the relay device sets a flag indicating the occurrence of congestion in its corresponding segment ID to relay the packet. With such a configuration, it is possible to determine which relay device the congestion occurs, at the reception side.

The second communication device may be characterized by, when determining based on the received data that there is a relay device in which congestion occurs in the transmission path of the data, transmitting, to the first communication device that has transmitted the data, notification data for notifying that congestion occurs in the relay device.

The communication device located at the packet (data) reception side can determine the occurrence of congestion, and accordingly can return a notification about in which relay device the congestion occurs to the packet (data) transmission side. This also makes it possible to take measures such as rerouting and suppression of data rate.

The second communication device may be characterized by, when transmitting the notification data, clearing the first flag and setting a second flag in an area different from the first flag.

The second flag being set in the received data indicates that the first flag has been detected and the flag has been switched by the second communication device that has received the packet. With this configuration, the first communication device can identify the transmission direction of data when congestion occurs (whether congestion has occurred in the process of transmitting the packet from the first communication device that is a transmission source or congestion has occurred in the process of transmitting the packet addressed to the first communication device).

The first communication device that has received the notification data may be characterized by taking measures to reduce the amount of data passing through the relay device in which the congestion occurs.

The measures to reduce data passing through the relay device in which congestion occurs include, for example but not limited to, interruption of data transmission, suppression of data rate, switching of transmission path, and the like.

The relay device may be characterized by, when detecting congestion in the relay device, transmitting, to the first communication device that has transmitted the data, second notification data for notifying that congestion occurs in the relay device.

Thus, the relay device may be characterized by, immediately when detecting congestion, transmitting the notification data to the first communication device. With this configuration, it is possible to quickly notify the occurrence of congestion.

The relay device may be characterized by, after transmitting the notification data, setting a third flag indicating that occurrence of congestion has already been notified to a transmission source in its corresponding segment ID out of a plurality of segment IDs contained in a routing header of the data.

Further, the second communication device may be characterized by, when the third flag is set in any one of the plurality of segment IDs contained in the routing header of the received data, not generating the notification data for the corresponding relay device.

After the relay device transmits the notification data, the second communication device does not have to generate the notification data. Therefore, the third flag may be set to notify that congestion has already been notified.

First Embodiment

A first embodiment will be described with reference to the drawings. FIG. 1 is an overall configuration diagram of a communication system according to the first embodiment. As illustrated, the communication system according to the first embodiment is a system in which a plurality of communication devices 10 transmit and receive packets via a network having a plurality of relay devices 20.

It is noted that although a communication device 10A and a communication device 10B are illustrated in FIG. 1, they are the same device. In the present embodiment, a side that generates and transmits a packet first corresponds to the communication device 10A, a side that receives the packet corresponds to the communication device 10B, and when it is not necessary to distinguish them, each is referred to as the communication device 10. Although a plurality of relay devices 20A, 20B, 20C, . . . are illustrated in FIG. 1, they are the same device. When it is not necessary to distinguish them, each is referred to as the relay device 20.

In the present embodiment, the communication device 10 and the relay device 20 perform Segment Routing compliant with SRv6. Segment Routing is a routing scheme that carries out traffic control according to segment IDs (referred to as SIDs if necessary) contained in a packet, and is a routing scheme aimed to achieve simple and flexible control by expressing a network as segments. Of types of Segment Routing, Segment Routing expressing the segments by using the IPv6 extension header is referred to as SRv6.

Figure 2:
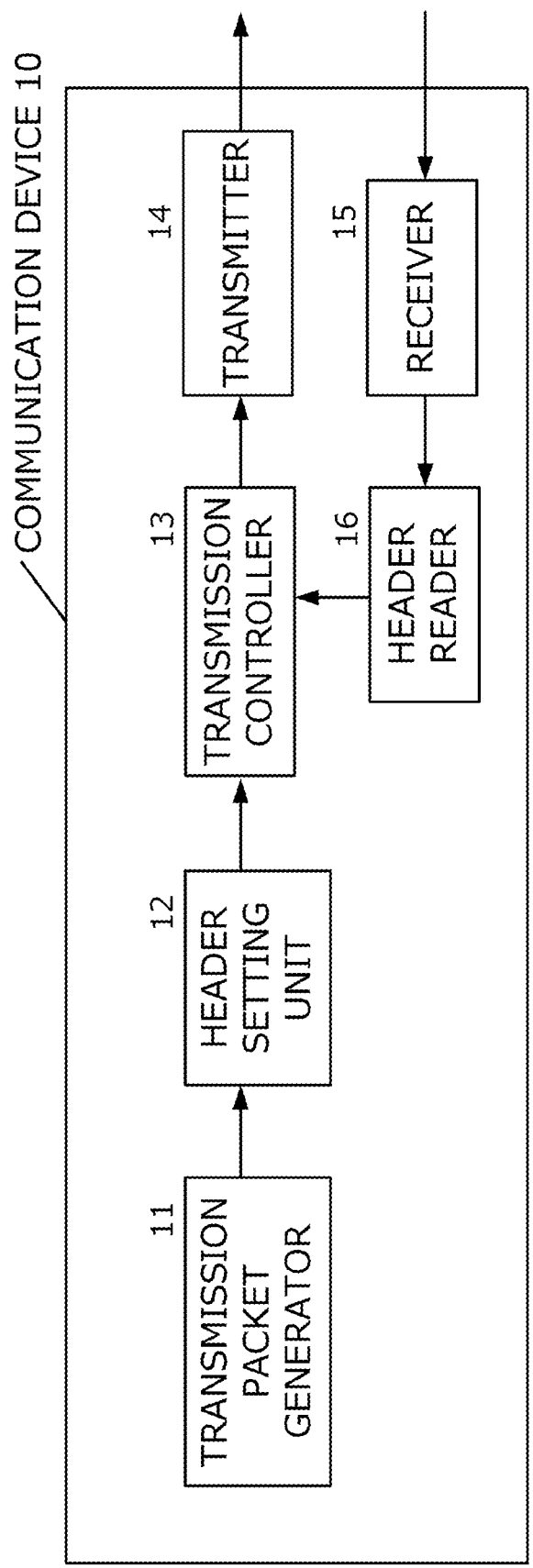
FIG. 2 is a functional configuration diagram of a communication device 10 according to a first embodiment.

First, a functional configuration of the communication device 10 according to the present embodiment will be described with reference to FIG. 2.

The communication device 10 includes a transmission packet generator 11, a header setting unit 12, a transmission controller 13, a transmitter 14, a receiver 15, and a header reader 16.

The communication device 10 can be configured as an information processing device including a CPU (operation processor), a main storage device, an auxiliary storage device, and a network interface. A program stored in the auxiliary storage device is loaded in the main storage device and executed by the CPU, thereby making the respective units illustrated in FIG. 2 function. It is noted that all or part of the illustrated functions may be implemented using a circuit designed specifically.

The transmission packet generator 11 is a unit configured to generate a packet including data addressed to the communication device 10 as a communication partner. In the present embodiment, the transmission packet generator 11 generates a packet in accordance with the format defined in IPv6.

The header setting unit 12 is a unit configured to add a header used in Segment Routing to the packet generated by the transmission packet generator 11. Specifically, the header setting unit 12 specifies a plurality of relay devices through which a packet passes, generates a list of a plurality of segment IDs corresponding to the plurality of relay devices, and inserts the list into the Segment Routing header.

The transmission controller 13 is a unit configured to detect that congestion has occurred in the process of transmitting the packet transmitted by the own device to another communication device 10 based on information read by the header reader 16 described later, and to take measures to avoid the congestion. The measures to avoid congestion include, for example but not limited to, temporary suspension of transmission, suppression of transmission data rate, and detouring of a relay device in which the congestion occurs. Further, the transmission controller 13 also has functions of detecting congestion has occurred in the process of transmitting a packet transmitted by another communication device 10 to the own device, and notifying the other communication device 10 of the occurrence of congestion. Detailed processing will be described later.

The transmitter 14 is a unit configured to transmit the generated packet to the network in accordance with the header generated by the header setting unit 12.

The receiver 15 is a unit configured to receive a packet addressed to the own device from the network.

The transmitter 14 and the receiver 15 transmit and receive packets via a network interface included in the device.

The header reader 16 is a unit configured to refer to the Segment Routing header included in the received packet and determine whether congestion occurs in the network. The determination result is fed back to the transmission controller 13, which takes measures for avoiding congestion or transmitting a notification to another communication device 10. Detailed processing will be described later.

Figure 3:
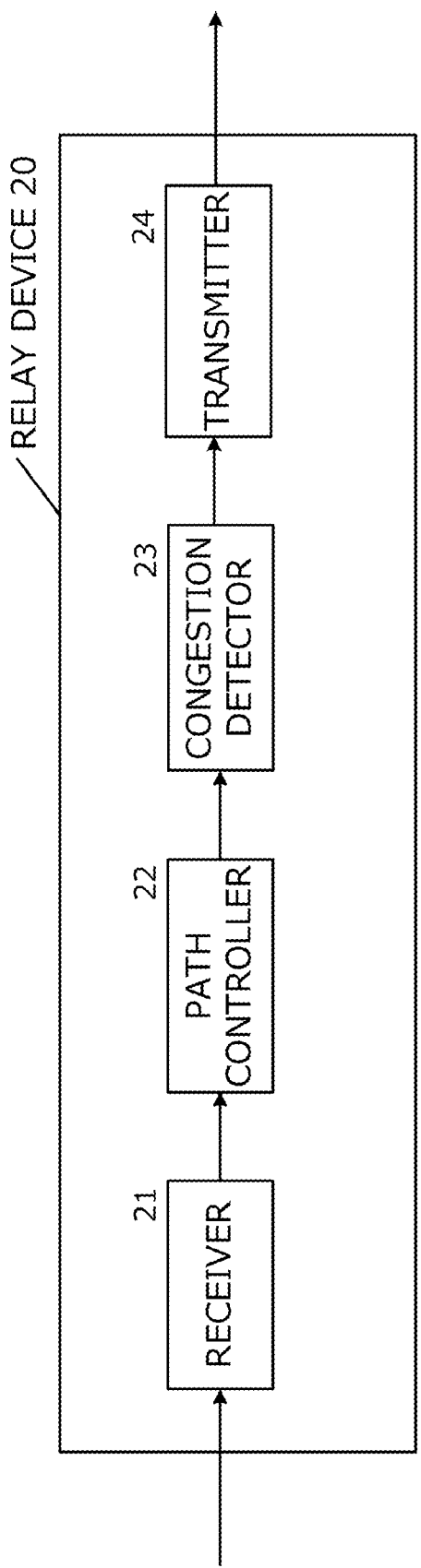
FIG. 3 is a functional configuration diagram of a relay device 20 according to the first embodiment.

Next, a functional configuration of the relay device 20 according to the present embodiment will be described with reference to FIG. 3.

The relay device 20 includes a receiver 21, a path controller 22, a congestion detector 23, and a transmitter 24.

The receiver 21 is a unit configured to receive a packet transmitted via the network. Further, the transmitter 24 is a unit configured to transmit a packet processed by the relay device 20 to the network. The receiver 21 and the transmitter 24 transmit and receive packets via a network interface included in the device.

The path controller 22 is a unit configured to determine the transfer destination of a received packet and rewrites its IPv6 header and Segment Routing header.

The congestion detector 23 is a unit configured to determine whether the transmission side of a packet that the relay device 20 is about to transmit is congested. When detecting the occurrence of congestion, the congestion detector 23 adds, to the segment ID of the own device included in the Segment Routing header, information for notifying that congestion occurs. This makes it possible to include, in the packet, information about where on the network congestion occurs.

The packet that has passed through the relay device 20 is transferred to the next hop destination (the other relay device 20 or the communication device 10 serving as the destination).

Figure 4:
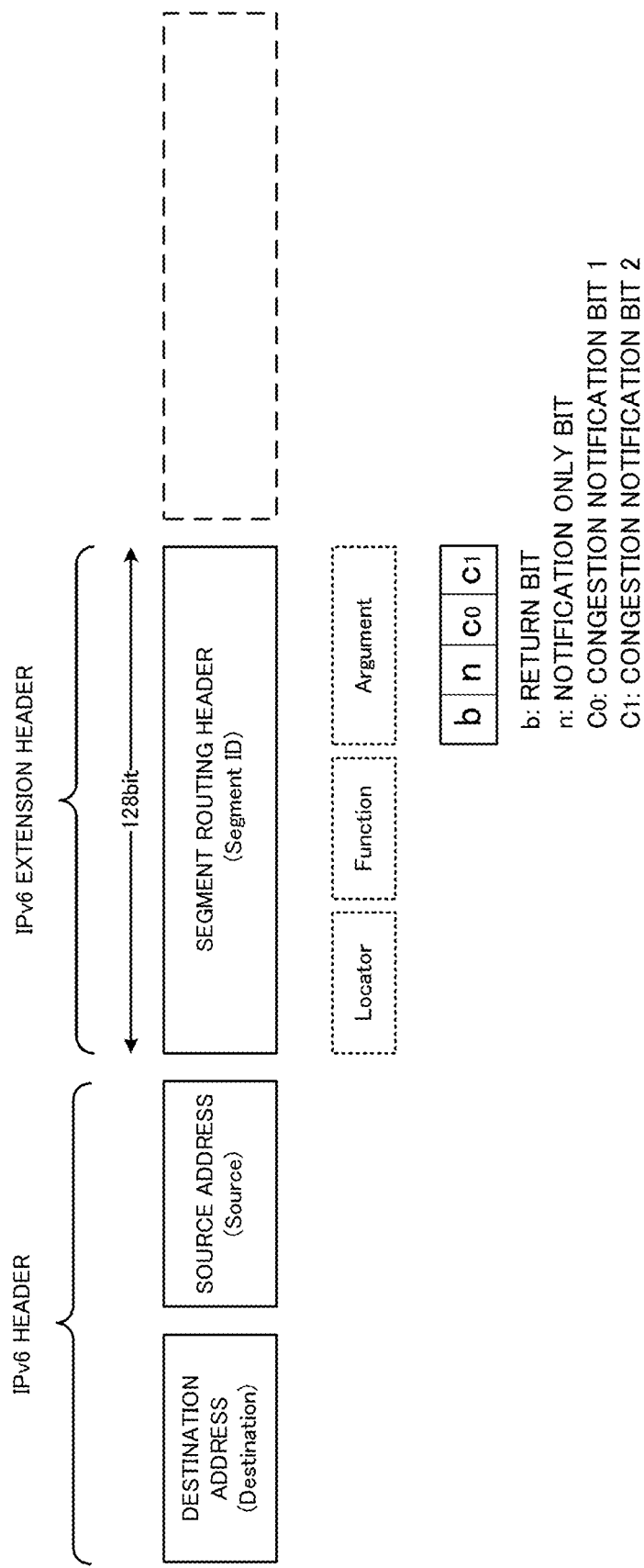
FIG. 4 is a schematic diagram of a packet to be transmitted in the embodiment.

FIG. 4 is a diagram showing a data format of a packet transmitted by SRv6 (a part of the basic header is omitted). As illustrated in FIG. 4, the packet is configured to have Destination address, Source address, and Segment Routing header (Segment ID). The Segment Routing header is a space in which information related to a request for routing is stored, and can store information such as Locator, Function, Argument, and the like. Locator is, for example, a field in which the identifier of a node executing the request is stored. Further, in Function, an identifier of the request (for example, the identifier of a function to be executed by a node performing routing) is stored. In the present embodiment, each relay device 20 detects congestion based on the value stored in "Function".

Further, "Argument" can store data used by the node when executing the request. The arrangement of these pieces of information can be freely designed within the size (128 bits) of the Segment Routing header. For example, it is possible to define different Function and Argument depending on each node, or to define Function and Argument that are shared among a plurality of nodes.

In the present embodiment, data related to congestion detection is stored in Argument. Specifically, as illustrated in FIG. 4, four bits of b, n, $c_0$, and $c_1$ are defined. The data is set for each segment ID. That is, a 4-bit data space is secured for each of the relay devices 20 through which the packet passes.

In the present embodiment, when the relay device 20 detects congestion in the process of relaying the packet, the bit $c_1$ included in its corresponding segment ID is set to a value of 1. Thus, all devices that receive the packet can recognize that congestion occurs in the relay device 20 corresponding to the segment ID. For example, the communication device 10B which is the destination of the packet can recognize the occurrence of congestion.

If it is configured to identify the occurrence of congestion by only one bit, there arises a problem that it is not possible to determine the transmission direction of the packet when the congestion occurs.

For example, consider a case where the communication device 10B that has received a packet notifies the communication device 10A that has transmitted the packet to the occurrence of congestion. In this case, if the content of the Segment Routing header is returned as they are, the same bits are used in the forward and return paths, so it is known that congestion has occurred in a relay device 20 but it cannot be determined whether the congestion occurs in the forward path or the congestion has occurred in the return path.

Therefore, in the present embodiment, two bits ($c_0$ and $c_1$) for notifying congestion are provided, and different bits are used depending on the transmission direction.

The specific operation will be described with reference to FIG. 5.

Consider an example in which a packet generated in the communication device 10A is transmitted to the communication device 10B via the relay devices 20A and 20B.

A::1 represents the IPv6 address of the communication device 10A.

B::1 represents the IPv6 address of the communication device 10B.

S1::ec:0 is the segment ID of the relay device 20A.

S2::ec:0 is the segment ID of the relay device 20B.

As described above, the segment ID is composed of the identifier of a node (Locator), the identifier of a request (Function), and information used by the node executing the request (Argument). That is, S1 and S2 are identifiers of the relay devices 20. ec is the identifier of a function of detecting congestion. Argument is initially 0.

At the time (1) when a packet is transmitted from the communication device 10A, the source address (hereinafter, SA) is A::1, and the destination address (hereinafter, DA) is the segment ID (S1::ec:0) of the relay device 20A which is the next hop destination. It is noted that SL means a list of segment IDs contained in the Segment Routing header. In the illustrated example, it is indicated that the packet is transferred via the relay device 20A (S1) and the relay device 20B (S2).

At the time (2) when a packet is transmitted from the relay device 20A, the DA changes to the segment ID (S2::ec:0) of the relay device 20B which is the next hop destination. This rewriting is performed in the relay device 20A.

Here, it is assumed that congestion is detected at an output interface of the relay device 20B.

In this case, the congestion detector 23 of the relay device 20B sets a value of 1 to the bit $c_1$ contained in Argument of its corresponding segment ID. Here, since (b, n, $c_0$, $c_1$)=(0, 0, 0, 1), the value of Argument is 1. That is, the segment ID corresponding to the relay device 20B is rewritten to S2::ec:1.

When the communication device 10B receives a packet whose destination is the communication device 10B, the communication device 10B refers to the Segment Routing header included in the received packet to confirm the presence or absence of a relay device in which congestion occurs. Here, when there is a segment ID in which the value of bit $c_1$ is 1, it is found that congestion occurs in the corresponding relay device.

In such a case, the communication device 10B generates a packet for notifying that congestion occurs in the path (hereinafter referred to as a congestion notification packet), and transmits the packet to the communication device 10A.

Specifically, the value of bit $c_1$ contained in Argument of the corresponding segment ID is reset to 0, and the bit $c_0$ is set to a value of 1.

By transmitting a congestion notification packet having such a bit string to the communication device 10A, the communication device 10A can recognize whether congestion has occurred in the process of transmitting a packet whose destination source is the communication device 10A or congestion has occurred in the process of transmitting a packet addressed to the communication device 10A.

For example, when the Segment Routing header included in the packet received by the communication device 10A contains a segment ID in which the bit $c_1$ is set to a value of 1, the communication device 10A can recognize that congestion has occurred in the transmission path of the packet addressed to the device itself. When the Segment Routing header contains a segment ID in which the bit $c_0$ is set to a value of 1, the communication device 10A can recognize that congestion occurs in the transmission path of the packet whose destination source is the communication device 10A and the communication partner detecting the congestion has transmitted a notification to the communication device 10A.

As described above, by providing two types of bits indicating the occurrence of congestion, it is possible to determine the transmission direction of the packet when congestion occurs.

It is noted that the communication device 10B further sets a value of 1 to the bit n when the communication device 10B generates the congestion notification packet. The bit n is a bit (bit for "Notification Only") indicating that the packet is for notification of congestion only (no payload).

Figure 5:
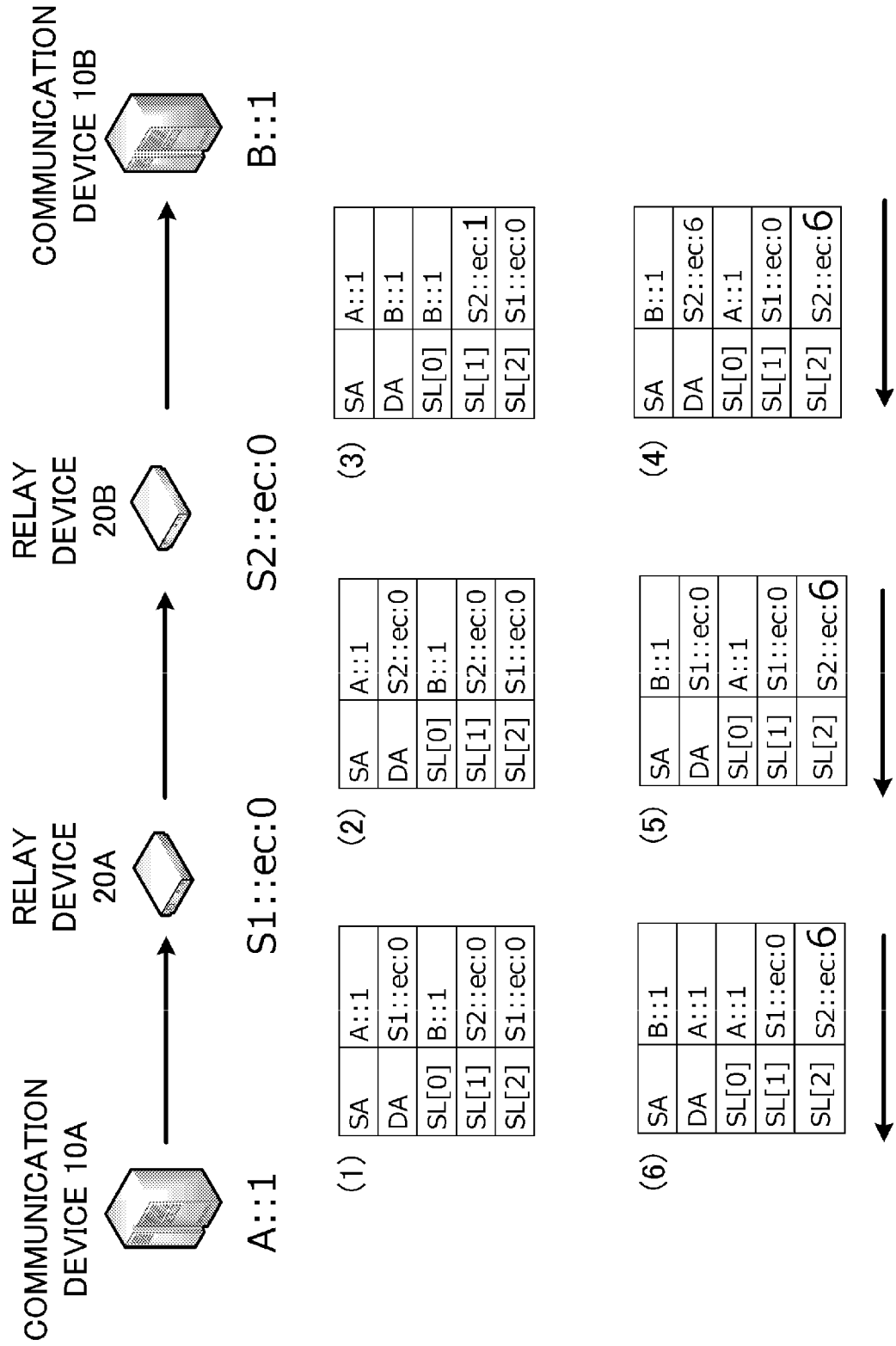
FIG. 5 is a diagram for describing a segment ID rewritten in the process of transmitting data.

That is, at the time (4) in FIG. 5, since (b, n, $c_0$, $c_1$)=(0, 1, 1, 0), the value of Argument of the segment ID corresponding to the relay device 20B is 6. The bit n is added in consideration of the convenience of the communication device 10 that is the destination to be notified. It is noted that it is possible to carry other data with the congestion notification packet. In that case, the value of bit n is 0.

The congestion notification packet generated in this manner follows a path in the reverse direction to the forward path and arrives at the communication device 10A.

In the case of the example of FIG. 5, the communication device 10A can recognize that congestion has occurred in the forward path and that congestion has occurred in the relay device 20B. This is because the bit $c_0$ is set to 1 in Argument of the segment ID corresponding to the relay device 20B. When the bit $c_0$ is 0 and the bit $c_1$ is set to 1, congestion occurs between the transmission of the packet from the communication device 10B and the arrival of the packet at the device itself.

Figure 6:
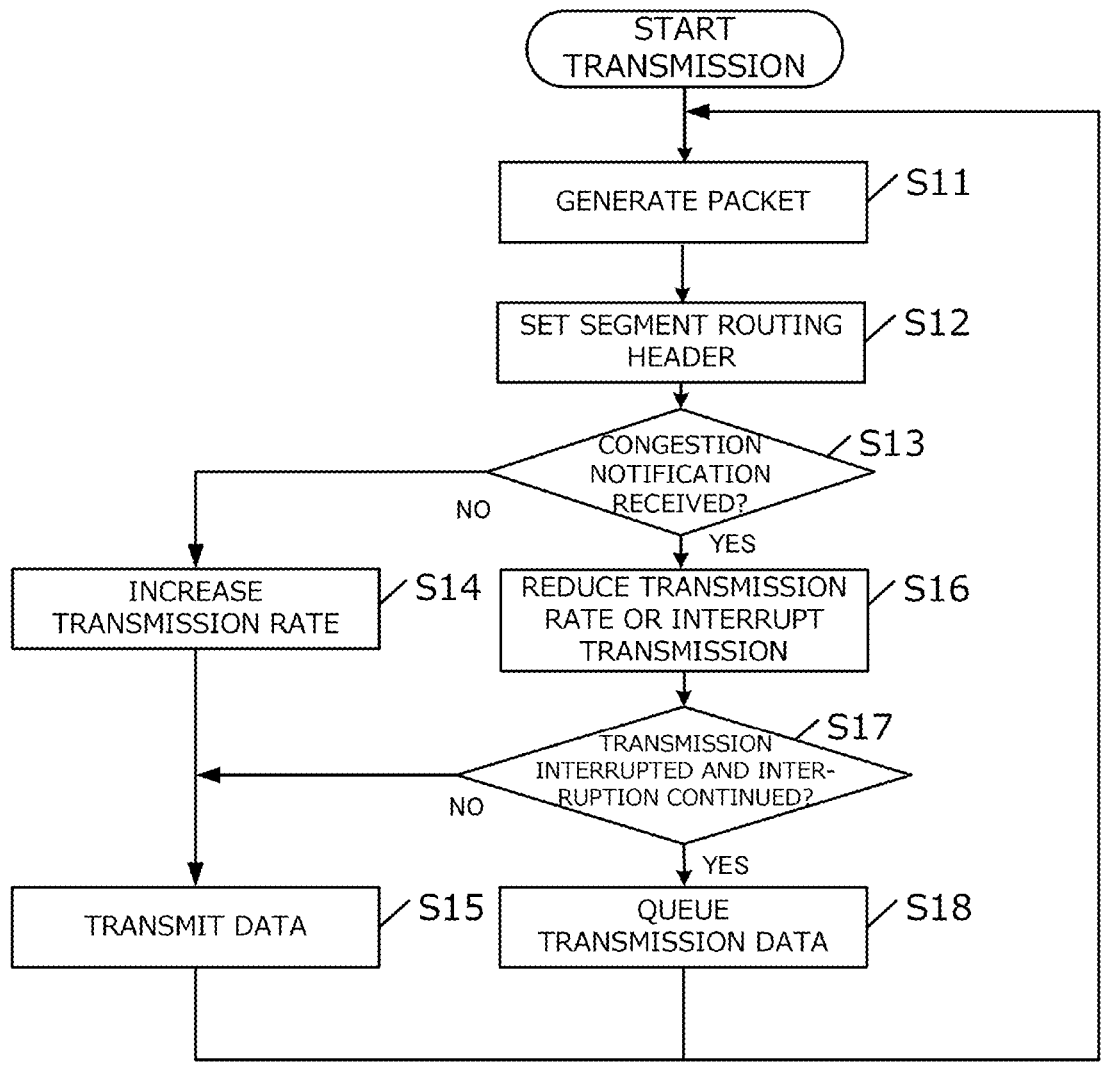
FIG. 6 is a flowchart showing packet transmission processing performed by the communication device 10.

Next, packet transmission processing performed by the communication device 10 will be described with reference to the flowchart in FIG. 6.

First, in step S11, the transmission packet generator 11 generates a packet to be transmitted.

Next, in step S12, the header setting unit 12 generates a transmission path of the packet and sets a Segment Routing header.

Next, in step S13, the transmission controller 13 determines whether a congestion notification related to the relay device 20 on the transmission path of the packet has already been received.

If the related congestion notification has not been received, the transmission controller 13 increases the transmission rate according to an arbitrary algorithm (step S14), and transmits the packet via the transmitter 14 in step S15.

In step S13, if the congestion notification has been received, the transmission controller 13 reduces the transmission rate according to an arbitrary algorithm, or temporarily interrupts the transmission (step S16).

In step S17, it is determined whether the transmission has been interrupted and whether or not the transmission interruption is to be continued. If the interruption of transmission is continued (step S17—Yes), data to be transmitted is stored in a queue (step S18). When the transmission is not interrupted or when the transmission is resumed (step S17—No), the transmission of the data is performed in step S15. The data stored in the queue is transmitted at this timing.

Figure 7:
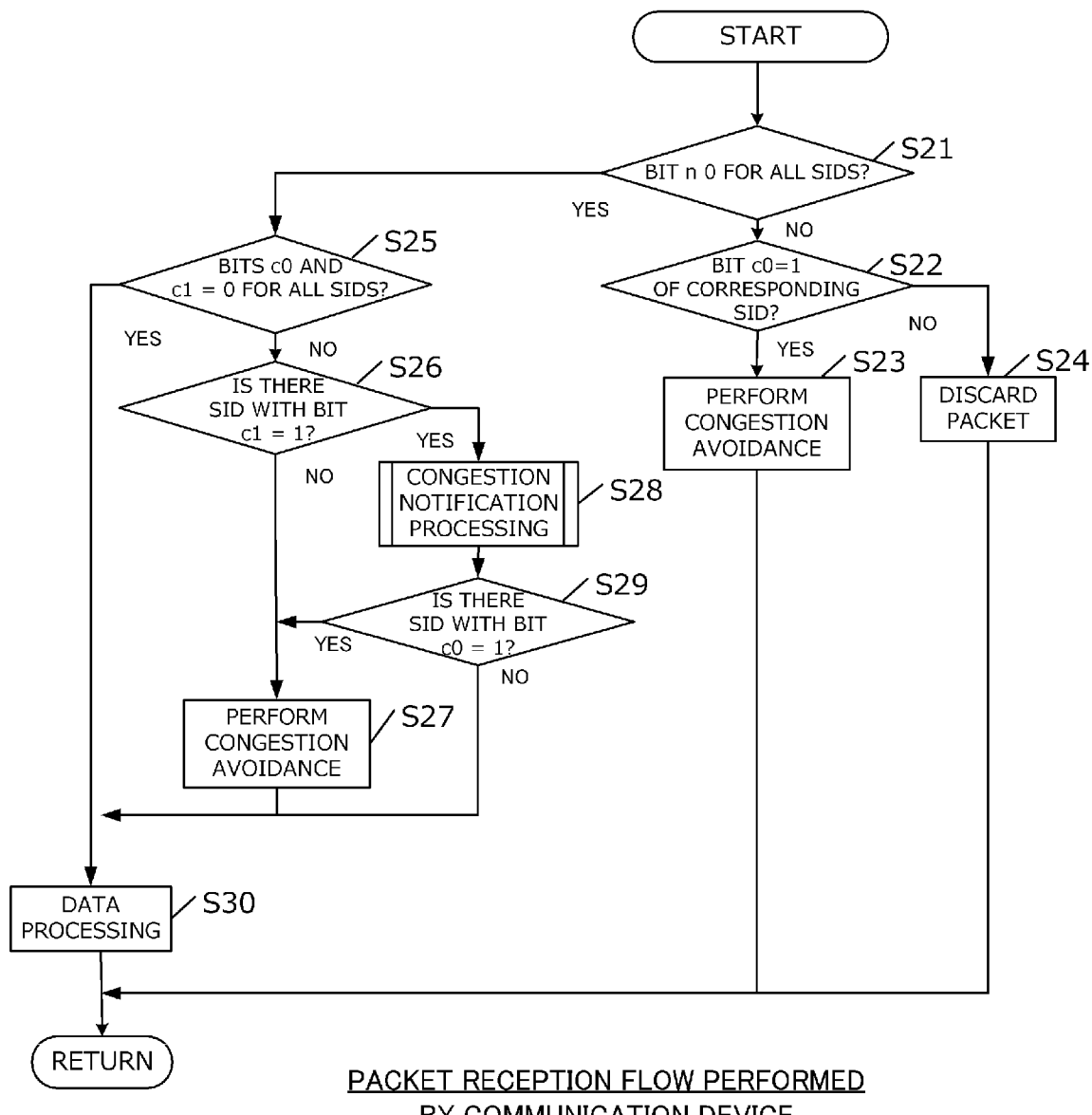
FIG. 7 is a flowchart showing packet reception processing performed by the communication device 10.

Next, packet reception processing performed by the communication device 10 will be described with reference to a flowchart in FIG. 7. The processing in FIG. 7 is started at the timing when the receiver 15 receives a packet addressed to the own device.

First, in step S21, the header reader 16 determines whether there is no segment ID whose bit n is set to 1 in the Segment Routing header included in the received packet.

If the determination is negative, it is known that the received packet is a packet only for congestion notification, and it is then determined whether or not the bit $c_0$ of the corresponding segment ID is set to a value of 1 (step S22). Here, if the determination is positive, congestion occurs in the corresponding relay device 20, so the processing proceeds to step S23, where the transmission controller 13 takes measures to avoid the congestion. If the determination in step S22 is negative, it is determined that the data is abnormal, and the packet is discarded (step S24). This is because the congestion notification packet must have the bit $c_0$ being set.

If the determination is positive in step S21, the processing proceeds to step S25, where it is determined that there is no segment ID whose bit $c_0$ or bit $c_1$ is set to a value of 1 in the Segment Routing header included in the received packet. If the determination is positive, no congestion occurs, so the processing proceeds to step S30, where the data stored in the payload is processed.

If the determination is negative in step S25, the processing proceeds to step S26, where it is determined whether there is a segment ID whose bit $c_1$ is set to a value of 1 in the Segment Routing header. The case where the determination is negative is that there is a segment ID whose bit $c_0$ is set to a value of 1 and there is no segment ID whose bit $c_1$ is set to a value of 1. In this case, the communication partner detects congestion generated in the process of transmitting a packet whose transmission source is the corresponding device, and the communication partner transmits a notification to the corresponding device, so the processing proceeds to Step S27, where the transmission controller 13 takes measures to avoid the congestion, and then data processing is performed in step S30.

The case where the determination is positive in step S26 is that congestion occurs between the transmission of the packet from the communication device 10 on the opposite side and the arrival of the packet at the corresponding device, so the processing proceeds to step S28, where processing for notifying congestion to the communication device 10 on the opposite side (hereinafter referred to as congestion notification processing) is performed (described later).

Thereafter, in step S29, it is determined whether or not there is a segment ID whose bit $c_0$ is set to a value of 1 in the Segment Routing header. If the determination is positive, it means that congestion is notified also from the communication partner, so the processing proceeds to step S27, where the device itself also takes measures to avoid the congestion. Finally, in step S30, the data stored in the payload is processed.

Figure 8:
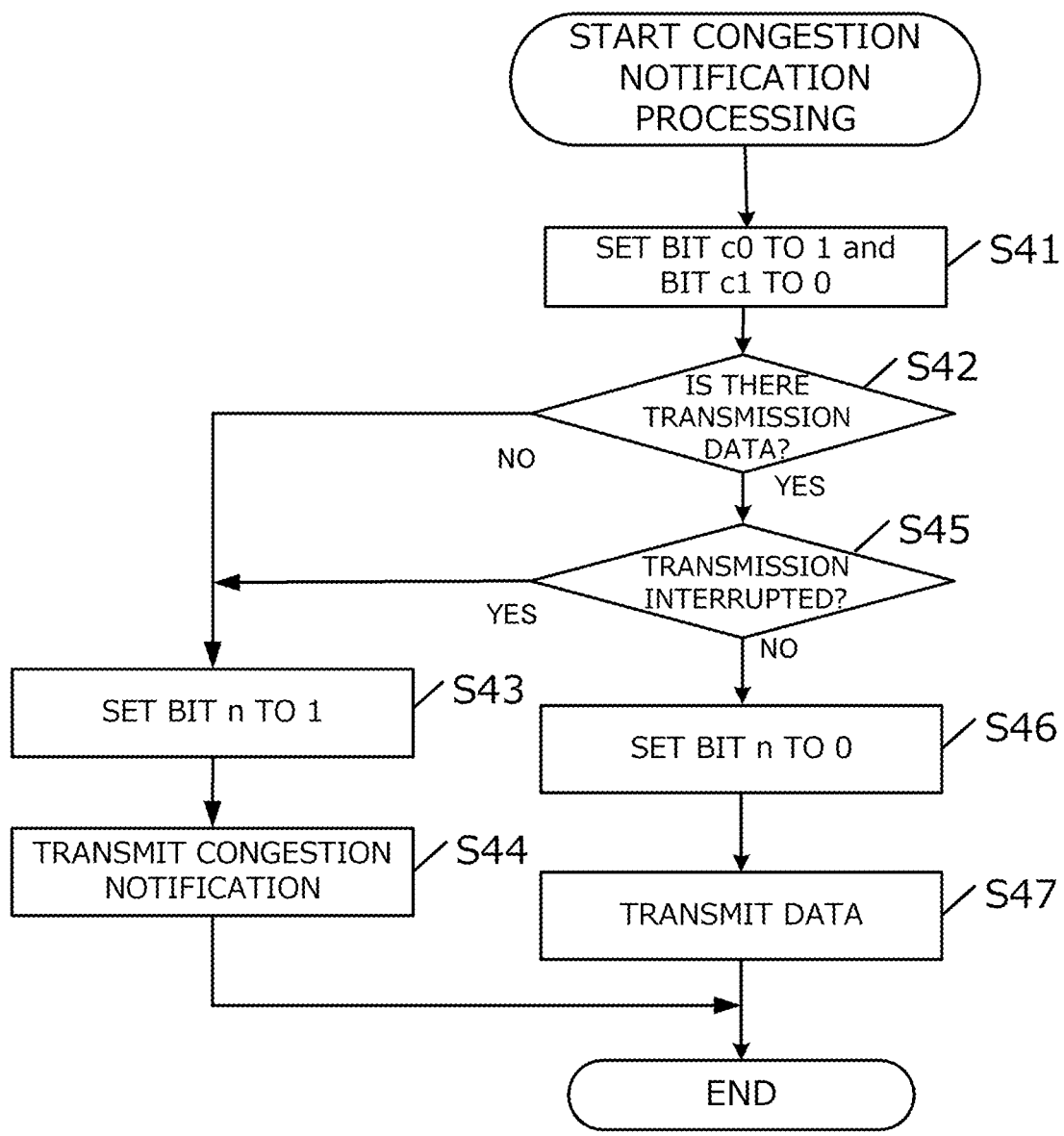
FIG. 8 is a flowchart showing congestion notification processing performed by the communication device 10.

Next, the congestion notification processing performed in step S28 will be described with reference to a flowchart of FIG. 8.

When congestion is notified to the communication device 10 on the opposite side, first, in step S41, the segment ID corresponding to the relay device 20 in which congestion occurs is identified, and the bit $c_0$ contained in Argument of the segment ID is set to a value of 1 and the bit $c_1$ is set to a value of 0.

Next, in step S42, it is determined whether or not there is data to be transmitted to the communication device 10 on the opposite side. If the determination is negative, the bit n is set to a value of 1 (step S43), and a congestion notification packet is transmitted to the communication device 10 on the opposite side (step S44).

If the determination is positive in step S42 (if there is data to be transmitted), the processing proceeds to step S45, where it is determined whether or not the transmission due to congestion is in interruption. If the transmission is in interruption, data transmission cannot be performed, so the processing proceeds to step S43, and only a congestion notification packet is then transmitted. If the transmission is not in interruption, the bit n 0 is set to a value of 0 (step S46), and a data packet is then transmitted to the communication device 10 on the opposite side (step S47).

Figure 9:
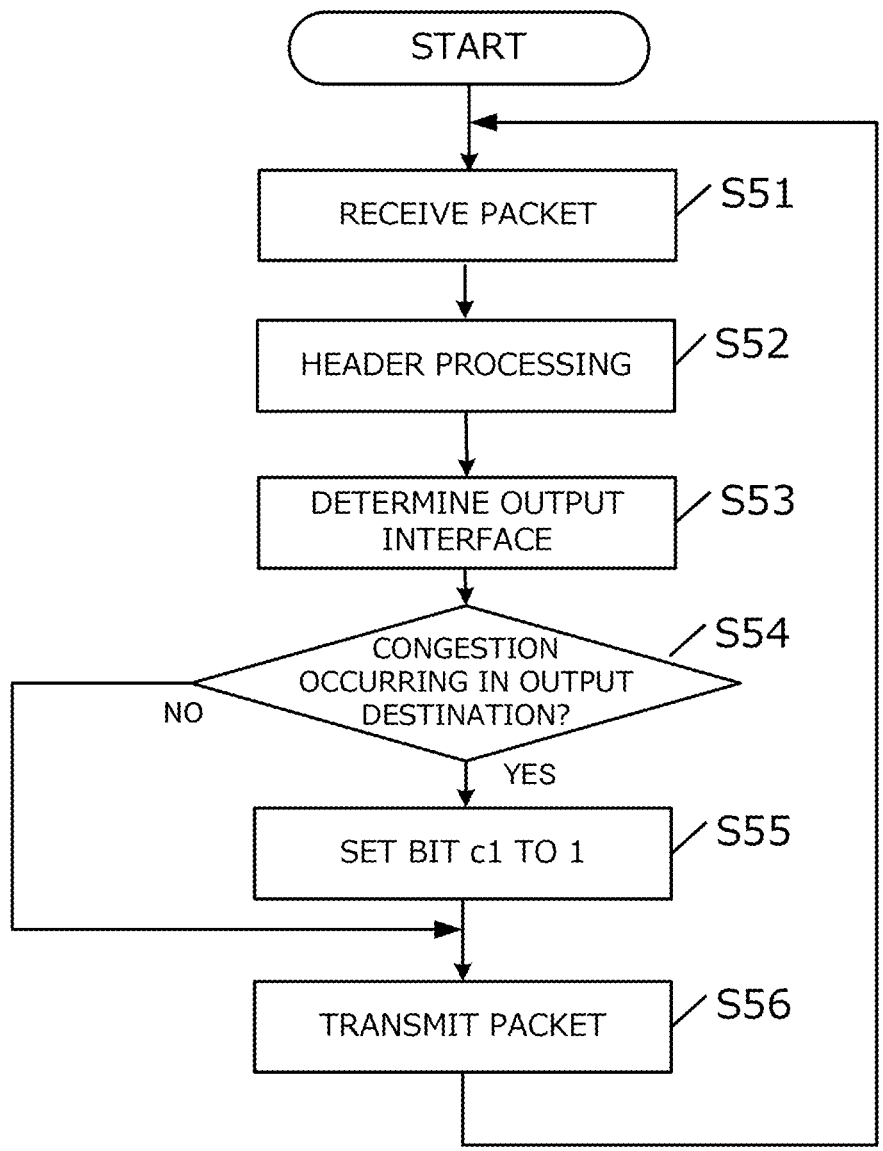
FIG. 9 is a flowchart showing processing performed by the relay device 20.

Next, packet relay processing performed by the relay device 20 will be described with reference to a flowchart in FIG. 9.

First, in step S51, the receiver 21 receives a packet.

In step S52, the path controller 22 refers to the Segment Routing header included in the received packet to perform processing for rewriting the destination address (header processing).

Next, in step S53, the path controller 22 refers to a stored routing table to determine an output interface for the packet.

Next, in step S54, the congestion detector 23 determines whether or not congestion occurs in the interface determined as the output destination. If the determination is positive, the bit $c_1$ is set to a value of 1 included in Argument of its corresponding segment ID (step S55).

Thereafter, in step S56, the transmitter 24 outputs the packet to the output interface. If the determination is negative in step S54, the processing proceeds to step S56.

As described above, according to the first embodiment, in the communication system using Segment Routing, it is possible to notify the communication device 10, which is the destination of a packet, of the location where congestion occurs on the network. Further, the occurrence of congestion and the location of occurrence can be notified to the communication device 10 that has transmitted the packet.

In particular, the transmission direction of a packet when congestion occurs can be determined, thereby allowing each communication device to take appropriate measures to suppress the congestion.

Second Embodiment

In the first embodiment, the communication device 10B that has received a packet generates a congestion notification packet, and transmits the packet to the communication device 10A that has transmitted the packet. On the other hand, a second embodiment is an embodiment in which the relay device 20 generates a congestion notification packet in the process of relay and returns it to the communication device 10A that is the transmission source.

Figure 10:
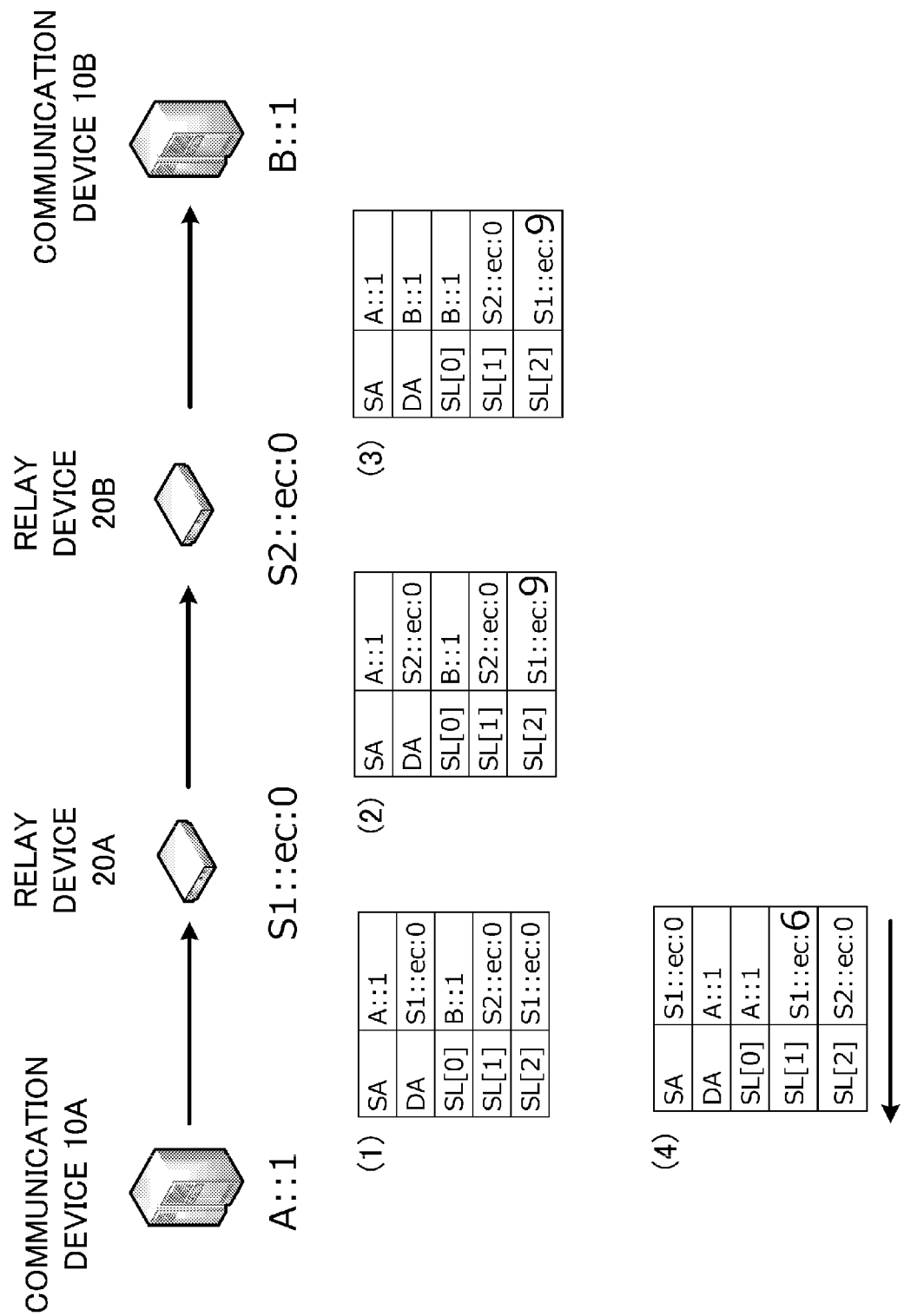
FIG. 10 is a diagram for describing a segment ID in a second embodiment.

The operation in the second embodiment will be described with reference to FIG. 10.

Consider an example in which a packet generated in the communication device 10A is transmitted to the communication device 10B via the relay devices 20A and 20B.

The content of the data at the time (1) is the same as that of the first embodiment.

Here, it is assumed that congestion is detected at the output interface of the relay device 20A.

In this case, the congestion detector 23 of the relay device 20A generates a congestion notification packet for the communication device 10A. As shown in (4), the congestion notification packet is a packet whose transmission source is the relay device 20A and whose destination is the communication device 10A. The relay device 20A sets a value of 1 to the bit n contained in Argument of its corresponding segment ID, and sets a value of 1 to the bit $c_0$. Here, since (b, n, $c_0$, $c_1$)=(0, 1, 1, 0), the value of Argument is 6. That is, the segment ID corresponding to the relay device 20A is S1::ec:6. According to the congestion notification packet, as in the first embodiment, the communication device 10A can recognize the location and direction of the congestion occurring.

In the second embodiment, since the relay device 20 transmits the congestion notification packet, it is necessary to prevent the communication device 10B from transmitting the congestion notification packet. Therefore, in the second embodiment, the relay device 20A sets a value to a bit indicating that "congestion has already been notified".

The bit b shown in FIG. 4 is a bit (Called "Return bit") indicating that the congestion notification packet has been returned in the transmission path.

The relay device 20A sets a value of 1 to the bit b contained in Argument of its corresponding segment ID, and sets a value of 1 to the bit $c_1$, for the packet to be relayed. Here, since (b, n, $c_0$, $c_1$)=(1, 0, 0, 1), the value of Argument is 9. That is, the segment ID corresponding to the relay device 20A is S1::ec:9. The communication device 10B, when receiving the packet, can recognize that the congestion notification packet has already been transmitted by the relay device 20A.

Figure 11:
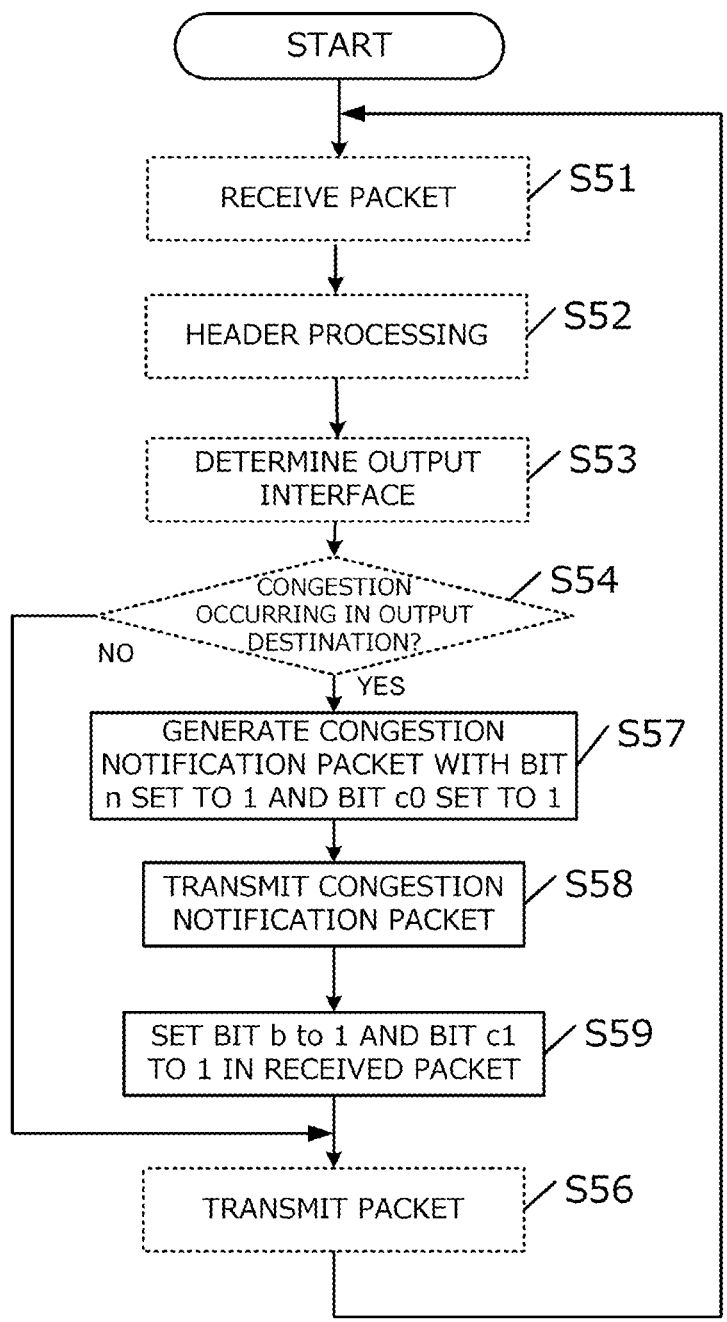
FIG. 11 is a flowchart showing processing performed by the relay device 20 in the second embodiment.

The packet relay processing performed by the relay device 20 in the second embodiment will be described with reference to a flowchart in FIG. 11. The same steps as in the first embodiment are shown by dotted lines, and their description is omitted.

In the second embodiment, when congestion occurs in the output interface, the relay device 20 generates a congestion notification packet in step S57. Specifically, the relay device 20 sets a value of 1 to the bit n contained in Argument of its corresponding segment ID, and sets a value of 1 to the bit $c_0$.

Next, in step S58, the relay device 20 transmits the congestion notification packet to the communication device 10 that has transmitted the packet to be relayed.

Next, in step S59, the relay device 20 sets a value of 1 to the bit b contained in Argument of its corresponding segment ID, and sets a value of 1 to the bit $c_1$, for the packet to be relayed.

Figure 12:
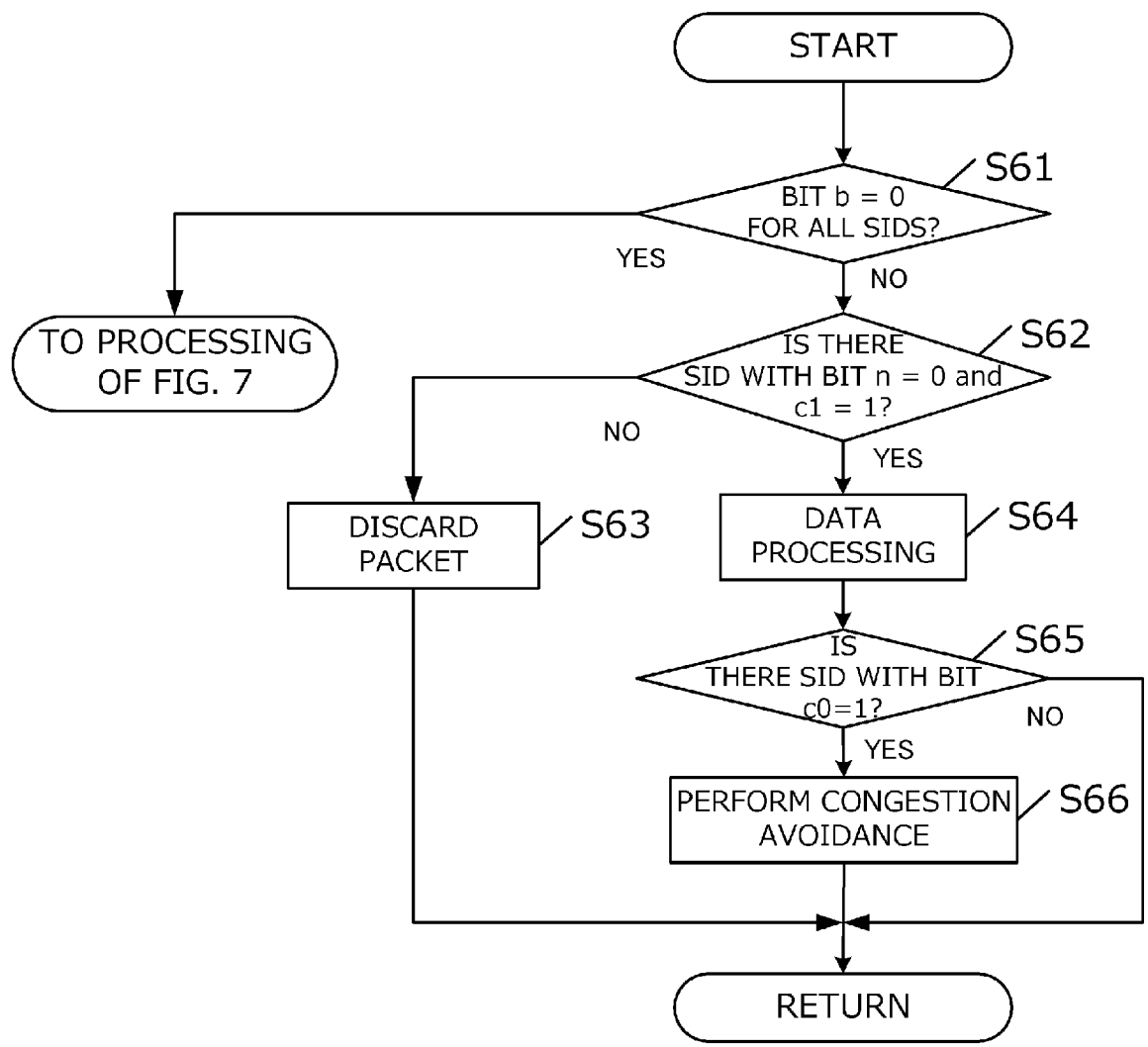
FIG. 12 is a flowchart showing packet reception processing performed by the communication device 10 in the second embodiment.

Next, packet reception processing performed by the communication device 10 in the second embodiment will be described with reference to a flowchart in FIG. 12. The processing in FIG. 12 is started at the timing when the receiver 15 receives a packet addressed to the own device.

First, in step S61, the header reader 16 determines whether there is no segment ID whose bit b is set to 1 in the Segment Routing header included in the received packet. If the determination is positive, the congestion notification is not performed by the relay device 20, so the processing proceeds to FIG. 7, and then the same processing as the first embodiment is performed.

If the determination is negative in step S61, it is determined whether or not there is a segment ID whose bit n is set to a value of 0 and whose bit $c_1$ is set to a value of 1 in the Segment Routing header included in the received packet (step S62). If the determination is negative, it is determined that the data is abnormal, and the packet is discarded (step S63).

If the determination is positive in step S62, data processing is performed in step S64.

Next, it is determined whether there is a segment ID whose bit $c_0$ is set to a value of 1 in the Segment Routing header included in the received packet (step S65). If the determination is positive, a measure to avoid congestion is taken in step S66. If the determination is negative, if step S63 ends, and if step S66 ends, then the processing returns to the initial state.

As described above, according to the second embodiment, when the relay device 20 detects congestion, the congestion notification packet is transmitted to the communication device 10A that has transmitted the packet. Thus, the occurrence of congestion can be notified to the communication device 10A quickly.

(Modification)

The processing and units described in the present disclosure can be freely combined and implemented as long as there is no technical contradiction.

The processing described as being performed by one device may be shared and executed by a plurality of devices. Alternatively, the processing described as being performed by different devices may be performed by one device. In a computer system, what hardware configuration (server configuration) realizes each function can be flexibly changed.

The present disclosure can also be realized by providing a computer with a computer program that implements the functions described in the above embodiments, and one or more processors of the computer reading and executing the program. Such a computer program may be provided to the computer by a non-transitory computer readable storage medium connectable to the computer's system bus, or may be provided to the computer via a network. The non-transitory computer readable storage medium includes, for example, any type of disc, such as a magnetic disc (floppy (registered trademark) disc, hard disk drive (HDD), and the like), optical disc (CD-ROM, DVD disc, Blu-ray disc, and the like); and any type of medium suitable for storing electronic instructions, such as read only memory (ROM), random access memory (RAM), EPROM, EEPROM, magnetic card, flash memory, and optical card.

What is claimed is:

1. A communication method in which a first communication device that is a transmission source of data, a second communication device that is a destination of the data, and one or more relay devices that relay the data transmit and receive the data using Segment Routing, wherein
   the relay device is configured to, when relaying the data, detect whether congestion occurs in the relay device, and when congestion occurs, set a first flag indicating an occurrence of congestion in a segment ID corresponding the relay device out of a plurality of segment IDs contained in a routing header of the data,
   the second communication device is configured to
      when there is a segment ID in which the first flag is set in a routing header of received data, determine that congestion occurs in the relay device corresponding to the segment ID, and
      when determining based on the received data that there is a relay device in which congestion occurs in a transmission path of the data, transmit, to the first communication device that has transmitted the data, notification data for notifying that congestion occurs in the relay device, and
   the relay device is further configured to
      when detecting congestion in the relay device, transmit, to the first communication device that has transmitted the data, second notification data for notifying that congestion occurs in the relay device, and
      after transmitting the second notification data, set a second flag indicating that occurrence of congestion has already been notified to a transmission source in a segment ID corresponding the relay device out of a plurality of segment IDs contained in a routing header of the data.

2. The communication method according to claim 1, wherein
   the second communication device is configured to, when transmitting the notification data,
   clear the first flag and set a third flag in an area different from the first flag.

3. The communication method according to claim 1, wherein
   the first communication device that has received the notification data is configured to
   take measures to reduce an amount of data passing through the relay device in which the congestion occurs.

4. The communication method according to claim 1, wherein
   the second communication device is configured to,
   when the second flag is set in any one of the plurality of segment IDs contained in the routing header of the received data, not generate the notification data for the corresponding relay device.

5. A communication system comprising a first communication device that is a transmission source of data, a second communication device that is a destination of the data, and one or more relay devices that relay the data transmit and receive the data using Segment Routing,
   wherein the relay device comprises
      a processor programed to
         detect whether or not congestion occurs in the relay device when the data is relayed; and
         when congestion occurs, set a first flag indicating an occurrence of congestion in a corresponding segment ID corresponding the relay device out of a plurality of segment IDs contained in a routing header of the data, the second communication device comprises
- a processor programed to
  - when there is a segment ID in which the first flag is set in a routing header of received data, determine that congestion occurs in the relay device corresponding to the segment ID, and
  - when determining based on the received data that there is a relay device in which congestion occurs in a transmission path of the data, transmit, to the first communication device that has transmitted the data, notification data for notifying that congestion occurs in the relay device, and the processor of the relay device is further programed to
- when detecting congestion in the relay device, transmit, to the first communication device that has transmitted the data, second notification data for notifying that congestion occurs in the relay device, and
- after transmitting the second notification data, set a second flag indicating that occurrence of congestion has already been notified to a transmission source in a segment ID corresponding the relay device out of a plurality of segment IDs contained in a routing header of the data.

* * * * *